H. V. OSBORNE & R. HAY.
Clothes-Drier.
No. 168,178.
Patented Sept. 28, 1875.
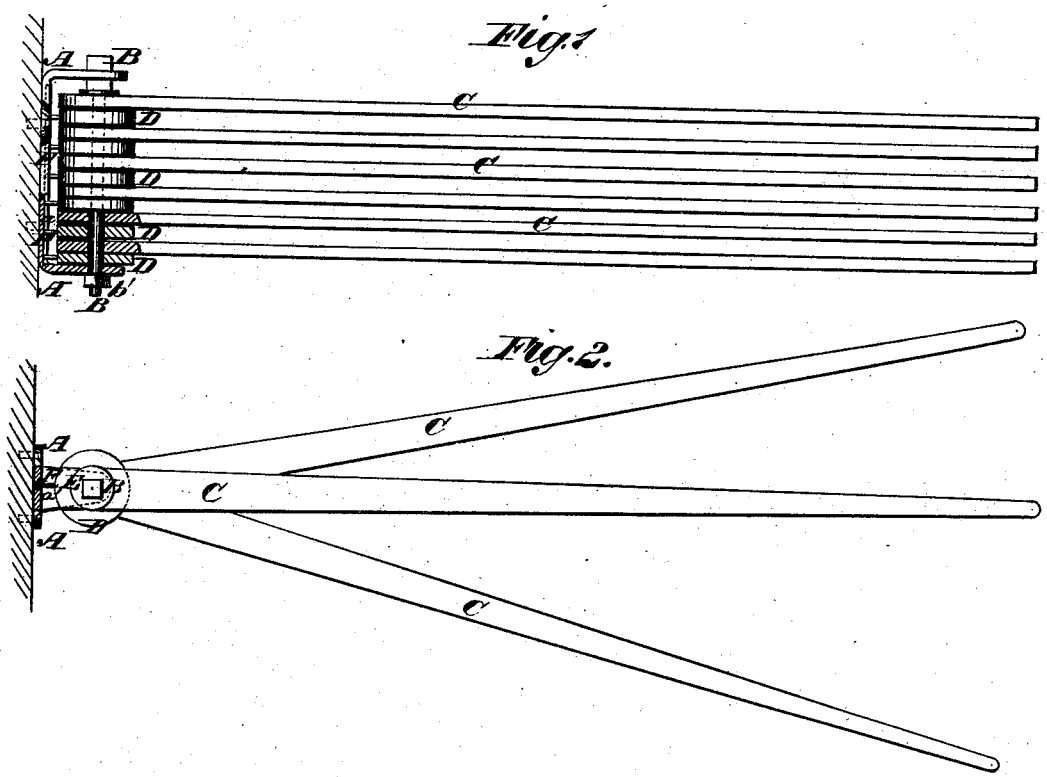
WITNESSES:
Francis McArdle
Alex F. Roberts
INVENTORS.
H. V. Osborne
BY R. Hay
Munn & Co
ATTORNEYS.

UNITED STATES PATENT OFFICE.

HARRISON V. OSBORNE AND ROBERT HAY, OF TRENTON, MISSOURI.

IMPROVEMENT IN CLOTHES-DRIERS.

Specification forming part of Letters Patent No. 168,178, dated September 28, 1875; application filed August 14, 1875.

*To all whom it may concern:*

Be it known that we, HARRISON V. OSBORNE and ROBERT HAY, of Trenton, in the county of Grundy and State of Missouri, have invented a new and useful Improvement in Clothes-Rack, of which the following is a specification:

Figure 1 is a side view of our improved clothes-rack, partly in section to show the construction. Fig. 2 is a top view of the same, partly in section to show the construction.

Similar letters of reference indicate corresponding parts.

The object of this invention is to furnish an improved rack for holding clothes to dry, or to air after being ironed, and which shall be so constructed that it may be readily closed and swung against the wall when not required for use, and which shall be simple in construction, inexpensive in manufacture, convenient in use, and very compact when folded, while being capable at the same time of holding a great many articles.

The invention consists in the combination of the bracket, made with a square hole in its upper end, and a longitudinal groove or slot in its body, the bolt made with a long square head, the pivoted arms, the washers provided with pins, and the upper washer, with each other, as hereinafter fully described.

A is a plate or bracket, the ends of which project outward at right angles, and in the body of the said bracket are formed a number of holes to receive the screws for securing it to a wall. In the upper end of the bracket A is formed a square hole to receive the long square head of the bolt B. The lower end of the bolt B passes down through a round hole in the lower end of the bracket A, and has a screw-thread cut upon it to receive the nut $b'$ for securing it in place. C is a set of arms of any desired or convenient length, and which have holes formed through their inner ends to receive the bolt B, so that they may turn upon the said bolt B. The pivoted ends of the arms C are separated from each other and from the lower end of the bracket A by washers D, through which the bolt B also passes. E is a washer placed upon the bolt B, between its head and the upper arm C, which, in connection with the long square head of said bolt, and the square hole in the upper end of the bracket A, enables the arms C to be drawn together and loosened, as may be desired. To each of the washers D is attached a pin, F, which enters a longitudinal groove or slot, $a$, in the body of the bracket A, to prevent the said washers from turning, so that any of the arms C may be turned upon the bolt B without affecting the position of the other arms, which could not be done were the washers D free to turn.

Having thus described our invention, we claim as new and desire to secure by Letters Patent—

The combination of the bracket A, made with a square hole in its upper end, and a longitudinal groove or slot in its body, the bolt B, made with a long square head, the pivoted arms C, the washers D, provided with pins F, and the washer E, with each other, substantially as herein shown and described.

HARRISON V. OSBORNE.
ROBERT HAY.

Witnesses:
MATTHEW G. KENNEDY,
EDGAR M. HARBER.